(12) United States Patent
Voisin et al.

(10) Patent No.: US 10,461,845 B2
(45) Date of Patent: Oct. 29, 2019

(54) FLEXIBLE PAYLOAD ARCHITECTURE FOR VHTS AND HTS APPLICATIONS

(71) Applicant: THALES, Courbevoie (FR)

(72) Inventors: Philippe Voisin, Toulouse (FR); Olivier Maillet, Toulouse (FR); Eric Desrousseaux, Toulouse (FR); Ludovic Schreider, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/052,053

(22) Filed: Aug. 1, 2018

(65) Prior Publication Data

US 2019/0044613 A1 Feb. 7, 2019

(30) Foreign Application Priority Data

Aug. 3, 2017 (FR) ..................................... 17 00823

(51) Int. Cl.
*H04B 7/204* (2006.01)
*H04B 7/185* (2006.01)
(Continued)

(52) U.S. Cl.
CPC ........... *H04B 7/2041* (2013.01); *H01Q 1/288* (2013.01); *H04B 7/18513* (2013.01); *H04B 7/18515* (2013.01); *H04W 84/06* (2013.01)

(58) Field of Classification Search
CPC ............... C12Q 1/001; G01N 27/3272; G01N 27/4145; H01Q 1/288; H04B 7/18513;
(Continued)

(56) References Cited

U.S. PATENT DOCUMENTS 6,125,261 A * 9/2000 Anselmo ............ H04B 7/18578
370/316
6,160,994 A 12/2000 Wiedeman
(Continued)

FOREIGN PATENT DOCUMENTS

EP 2 930 862 A2 10/2015

*Primary Examiner* — Tan H Trinh
(74) *Attorney, Agent, or Firm* — Baker & Hostetler LLP

(57) ABSTRACT

A VHTS or HTS multibeam telecommunications payload includes a first multibeam antenna system with passive antennas, which is configured to receive from and transmit to spots of access stations GW respectively in a first satellite receive Rx band and a first satellite transmit Tx band, and a second multibeam antenna system with passive antennas, which is configured to receive from and transmit to a user coverage zone respectively in a second satellite receive Rx band and a second satellite transmit Tx band, by generating multiple satellite receive user spots and multiple satellite transmit user spots. The payload is wherein it comprises a digital core, based on a digital transparent processor DTP offering total connectivity and total flexibility of allocation of frequency slots to the access station and user spots, and associated with the DTP an RF switching set, made up of one or more matrices of RF switches on source accesses of user spots in satellite transmit Tx only or in satellite transmit Tx and in satellite receive Rx so as to implement operation by beam hopping on clusters Gj/G'j of Tx and/or Rx user spots for which the number of spots Rj/R'j is less than or equal to the total number P of access station spots.

15 Claims, 9 Drawing Sheets

(51) Int. Cl.
*H01Q 1/28* (2006.01)
*H04W 84/06* (2009.01)

(58) Field of Classification Search
CPC .. H04B 7/18515; H04B 7/2041; H04W 84/06
USPC ................. 455/12.1, 427; 370/307, 316.711;
342/354
See application file for complete search history.

(56) References Cited

U.S. PATENT DOCUMENTS

| | | | |
|---|---|---|---|
| 6,708,029 B2* | 3/2004 | Wesel ................. | H04B 7/18578 370/307 |
| 7,400,857 B2* | 7/2008 | Chang ................. | H01Q 21/007 455/12.1 |
| 8,542,626 B2* | 9/2013 | Voisin ................. | H04B 7/2041 370/316 |
| 9,942,082 B2* | 4/2018 | Noerpel ................. | H04L 27/36 |
| 10,291,317 B2* | 5/2019 | Tong ..................... | H04B 7/2041 |
| 2011/0317620 A1* | 12/2011 | Voisin ................. | H04B 7/18515 370/316 |
| 2012/0075149 A1* | 3/2012 | Palacin ................. | H01Q 25/007 343/711 |
| 2013/0009809 A1* | 1/2013 | Bert ..................... | H04B 7/2041 342/354 |
| 2014/0112241 A1* | 4/2014 | Gayrard ............. | H04B 7/18543 370/316 |
| 2016/0373991 A1* | 12/2016 | Corbel ............... | H04B 7/18515 |
| 2017/0181160 A1* | 6/2017 | Corbel ................. | H04B 17/336 |
| 2017/0288769 A1* | 10/2017 | Miller .................... | H04B 7/212 |

\* cited by examiner

FLEXIBLE PAYLOAD ARCHITECTURE FOR VHTS AND HTS APPLICATIONS

CROSS-REFERENCE TO RELATED APPLICATIONS

This application claims priority to foreign French patent application No. FR 1700823, filed on Aug. 3, 2017, the disclosure of which is incorporated by reference in its entirety.

FIELD OF THE INVENTION

The present invention relates to a flexible architecture of telecommunications payload, and more particularly of multibeam or multi-spot telecommunications payload of very high capacity, embedded on board a telecommunications satellite, for VHTS (Very High Throughput Satellite) applications or HTS (High Throughput Satellite) applications.

BACKGROUND

For high-capacity HTS applications and more particularly very-high-capacity VHTS applications, telecommunications operators wish to have space telecommunications payloads that are sufficiently flexible to meet their needs in terms of:

capacity or capability for allocating passband to the user spots meeting the traffic needs, and capacity or capability to dynamically adapt the transmission capacity, in terms of quantity or volume of transmission resources, allocated to each user spot according to the variations in traffic demand; and capacity or capability to rationalize, that is to say minimize, the number of satellite access stations, termed "gateways" and referred to hereinafter as access stations, to meet the instantaneous transmission capacity demanded over the whole set of user spots, capacity or capability for progressive rollout of the capacity with a minimum of satellite access stations at the start of life while being able to serve the user spots requiring resources; and capacity or capability to offer the entire band available to each user spot so as to avoid frequency coordination problems; and capacity or capability to offer links of meshed type making it possible to directly connect certain user spots together at the on-board level (i.e. the payload), that is to say without passing via the ground, capacity or capability to connect several access stations to one and the same user spot.

Most existing payload architectures, currently proposed or developed in order to allocate transmission capacity to the spots, are based on frequency division of the transmission resources, and typically consist in determining beforehand and forecasting the traffic which might be necessary on each user spot as a function of criteria dependent on economic analyses, of the type among others of population density of the zone covered by the user spot and/or rate of penetration of the terrestrial cellular telecommunications or ground systems, and in best optimizing the architecture of the payload to meet this traffic need defined beforehand. The result obtained by using such an approach typically consists of a static architecture of payload, such as for example that described in FIGS. 1A and 1B, which involves several parameters for adapting the load of each user spot with respect to the final traffic need forecasted, these parameters being defined in terms:

of management of user spots of different diameter, for example fine spots on very capacitive zones and wider spots on less capacitive zones;

of allocation of more or less satellite transmit Tx band per user spot (forward pathway of the transponder in FIG. 1A departing from the access stations connected to the ground network infrastructure, i.e. "forward section" or "Outbound") and of more or less receive Rx band per user spot (return pathway of the transponder in FIG. 1B arriving at the access stations connected to the ground network infrastructure, i.e. "return section" or "Inbound"); according to FIG. 1A, the transmit band amplified by each high power amplifier HPA on the Tx side of the payload is divided into sub-bands via a frequency demultiplexer (DMUX), for example here a frequency duplexer. According to FIG. 1B and in a symmetric manner, the reception band amplified by each low noise amplifier LNA on the Rx side of the payload is the additional combination of sub-bands via a combiner frequency multiplexer (CMUX), here with two inputs;

of number of access stations GWs, which is defined by the sum of each maximum of transmission capacity that may be necessary for a user spot (and not by the maximal transmission capacity required by the satellite system), this leading to a greater number of access stations than the actually useful need.

It is possible to introduce flexibility into the static architectures described hereinabove by using electromechanical switches and by adding further demultiplexers DMUX and/or multiplexers CMUX. These additional devices afford a little flexibility in selecting the access stations which will serve certain user spots and in selecting the bandwidth allocated to a user spot, but the flexibility remains limited.

Moreover, though the payload architectures obtained by adding these devices can offer a response to meet certain needs requiring limited flexibility, these architectures remain incompatible with the needs defined in terms:

of capacity for each user spot to access the total frequency band of the VHTS or HTS service, each user spot accessing only a fraction of the total band allocated on account of the use of demultiplexers DMUX in satellite transmit Tx and of multiplexers CMUX in satellite receive Rx, and of existence of a simple solution with limited losses which would make it possible to allocate more or less band per user spot or indeed another band;

of an unacceptable over-dimensioning of the whole of the payload architecture if the total band of the VHTS or HTS user service is allocated to each user spot;

of progressive rollout of the services with a minimum of access stations except at the price of a non-negligible complexity of the architecture and a significant impact on the mass of the payload;

of links of "mesh" type, the creation of $N^2$ paths being necessary for a given number N of generated user spots, this being totally unrealistic as regards the global impacts on the payload.

SUMMARY OF THE INVENTION

The technical problem is to provide a VHTS or HTS payload architecture, of lower mass and of lesser complexity in terms of number of RF switches used, which satisfies the service requirements of a VHTS or HTS payload itemized as:

the capacity for allocating passband to the spots meeting the traffic needs; and the capacity for dynamically varying the capacity allocated to each spot according to the variations in traffic demand;

the capacity to rationalize the number of satellite access stations, termed "gateways" and referred to hereinafter as access stations, to meet the instantaneous capacity demanded over the whole set of spots;

the capacity for progressive rollout of the capacity with a minimum of satellite access stations at the start of life while being able to serve the spots requiring resources; and the capacity to offer the entire band available to each spot so as to avoid frequency coordination problems; and the capacity to offer links of "mesh" type making it possible to directly connect certain spots together at the on-board level, that is to say without passing via the ground; and the capacity to connect several access stations to one and the same spot.

For this purpose, the subject of the invention is a multibeam telecommunications payload for applications of VHTS very-high-throughput space telecommunications or of HTS high-throughput space telecommunications comprising:

a first multibeam antenna system of passive antennas, which is configured to receive from satellite receive Rx access station GW spots and transmit to satellite transmit Tx access station GW spots, respectively in a first satellite receive Rx band and a first satellite transmit Tx band; and a second multibeam antenna system of passive antennas, which is configured to receive from and transmit to a user coverage zone respectively in a second satellite receive Rx band and a second satellite transmit Tx band, by generating multiple satellite receive user spots and multiple satellite transmit user spots.

The payload is characterized in that it comprises: a digital core, based on a digital transparent processor DTP, dimensioned through a sufficient number of accesses at input and at output to be connected to all the spots of the access stations and all the user spots, and configured to offer total connectivity and total flexibility of allocation of frequency slots to the access station and user spots; and an RF switching set, made up of one or more matrices of RF switches on source accesses of user spots in satellite transmit Tx only or in satellite transmit Tx and in satellite receive Rx so as to implement operation by beam hopping on clusters Gj/G'j of Tx and/or Rx user spots for which the number of spots Rj/R'j is less than or equal to the total number P of access station spots.

According to particular embodiments, the VHTS payload comprises one or more of the following characteristics taken in isolation or in combination:

when the payload is of VHTS type, the first receive Rx band comprises a part of the V-band, lying between 47.7 GHz and 51.4 GHz, formed by a first sub-band and/or a second sub-band which are mutually separated or adjacent, and/or a part of the Ka-band, lying between 27.0 GHz and 30 GHz, forming a third sub-band, and the first transmit Tx band comprises a fourth sub-band, part of the Q-band, lying between 37.5 GHz and 42.5 GHz, and the second receive Rx band comprises a fifth sub-band, part of the Ka-band lying between 29.5 GHz and 30 GHz, and separated from or adjacent to the third sub-band, and the second transmit Tx band comprises a sixth sub-band, part of the Ka-band, lying between 17.3 GHz and 20.2 GHz; or when the payload is of HTS type, the first receive Rx band comprises a first sub-band, part of the Ka-band, lying between 27.0 GHz and 29.5 GHz, and the first transmit Tx band comprises a second sub-band, part of the Ka-band, lying between 17.3 GHz and 17.7 GHz, and the second receive Rx band comprises a third sub-band, part of the Ka-band, lying between 29.5 GHz and 30 GHz, and the second transmit Tx band comprises a fourth sub-band, part of the Ka-band, lying between 17.7 GHz and 20.2 GHz;

the first multibeam antenna system comprises an integer number P, greater than or equal to 2, of accesses to the receive spots of the access stations GW, equal to the total number of access stations GW, and is configured so that each access station GW receive spot created services a single access station GW, and the multibeam telecommunications payload furthermore comprising P first low noise amplifiers LNA, each LNA being connected between the single access of a satellite Rx receive spot of a different access station and a different input of the digital transparent processor DTP;

the first multibeam antenna system comprises a number P of accesses to the transmit spots of the access stations GW equal to the total number of access stations GW and is configured so that each access station transmit spot services a single access station GW, and the payload comprises a number P of second power amplifiers HPA connected between the P transmit accesses of the access stations GWs and outputs of the digital transparent processor DTP;

the second multibeam antenna system comprises an integer number N of source accesses to the satellite transmit user spots, and the payload comprises: a number K1 of third RF power amplifiers HPA connected directly to K1 source accesses to the satellite transmit user spots taken from among the N transmit user spot accesses, K1 being an integer number less than or equal to N−1, and a number K2 of third RF power amplifiers HPA connected to the N−K1 remaining transmit user spot source accesses through K2 switching matrices Mj, each allowing the implementation of beam hopping on a different cluster Gj of Tx user spots for which the number of spots Rj is less than or equal to the total number P of spots of transmit Tx access stations GW, the integer numbers N, K1, K2 and Rj, j varying from 1 to K2 satisfying the relation: $N = K1 + \sum_{j=1}^{K2} R_j$;

the second multibeam antenna system comprises an integer number of source accesses to the satellite receive transmit user spots which is equal to the number N, and the payload comprises: a number K'1 of fourth low noise RF amplifiers LNA connected directly to K'1 source accesses to the satellite receive user spots taken from among the N receive user spot accesses, and a number K'2 of fourth low noise RF amplifiers LNA connected to the N−K'1 remaining receive user spot source accesses through K'2 switching matrices Nj, each allowing the implementation of beam hopping on a different cluster G'j of receive Rx user spots for which the number of spots R'j is less than or equal to the total number P of spots of receive Rx access stations GW, the integer numbers N, K'1, K'2 and R'j, j varying from 1 to K'2 satisfying the relation: $N = K'1 + \sum_{j=1}^{K'2} R'_j$;

the multibeam telecommunications payload furthermore comprises conversion chains, connected around the digital transparent processor DTP, and configured to interface the RF components of the payload operating in the first and second transmit Tx and receive Rx bands and inputs and outputs of the transparent digital processor operating at a useful intermediate frequency compatible with the useful-band widths managed by access in reception and in transmission of the processor;

the digital transparent processor DTP is configured to create frequency paths characterized by a connectivity between the access spots GW and the user spots for the forward pathway and between the user spots and the access spots in return pathway, and a frequency plan taking into account a traffic need and frequency coordination constraints;

each matrix Mj of RF switches on source accesses of user spots in satellite transmit Tx only or in satellite transmit Tx and in satellite receive Rx, part of the RF switching set, is configured to distribute temporally, in satellite transmit Tx the signal amplified by the power amplifier directly connected upstream of the matrix Mj on the user spots according to a predetermined transmit Tx temporal allocation plan for transmit time slots, and in satellite receive Rx the signals of the user spots connected to one and the same matrix Nj on the low noise amplifier directly connected downstream of the said matrix Nj according to a predetermined receive Rx temporal allocation plan for receive time slots;

the multibeam telecommunications payload furthermore comprises a calculator or several calculators for configuring in a static or dynamic manner the digital processor DTP in terms of a matrix of connectivity from the access spots GW to the user spots for the forward pathway and from the user spots to the access spots for the return pathway and in terms of a frequency plan, and the matrix or matrices of switches for the implementation of beam hops in terms of a transmit Tx temporal allocation plan, or in terms of a transmit Tx temporal allocation plan and of a receive Rx temporal allocation plan, the connectivity matrix, the frequency plan and the temporal allocation plan(s) depending on the spatial and temporal distribution of the traffic demand as a whole of the user spots and frequency coordination constraints;

the multibeam telecommunications payload furthermore comprises a memory of configurations of the digital processor DTP and of the BH switch matrix or matrices, in which different configurations in terms of triplets each made up of a connectivity matrix, a frequency plan, a transmit Tx temporal allocation plan or of quadruplets each made up of a connectivity matrix, a frequency plan, a transmit Tx temporal allocation plan and a receive Tx temporal allocation plan, the configurations being activatable at different instants forming a configurations activation sequence;

the digital transparent processor DTP is configured to provide total flexibility in terms of passband allocation to the user spots as a function of the traffic needs without overdimensioning the number of access stations GW;

each transmit BH switch matrix Mj, connected to a single power amplifier HPA and associated with a group Gj of transmit user spots, is configured to connect in turn a transmit user spot of the group Gj to the power amplifier HPA and allow it to receive the entire band amplified by the said HPA, and the digital transparent processor DTP is configured to load each amplifier HPA, connected to a transmit BH switch matrix Mj, with the frequency bands actually available on account of possible coordination constraints for the set Gj of transmit user spots connected to the same HPA;

the digital transparent processor DTP is configured to load each amplifier HPA, connected to a transmit BH switch matrix Mj, with the quantity of frequency band required to meet the temporal traffic variations demanded of the transmit user spots of the group Gj that are connected to the corresponding power amplifier HPA, and the transmit BH switch matrices Mj are configured for beam hopping with possible modulation of the temporal sharing of the time between the spots of one and the same group Gj that are connected to one and the same HPA so as to supplement the capability of the DTP to allocate more or less band and to meet the faster traffic variations which the DTP cannot meet;

the digital transparent processor DTP and the beam hopping switch matrices are configured to connect several Rx access station access spots to one and the same Tx user spot while ensuring independent management of the gains of channels arising from each access station GW connected to the said same transmit user spot.

BRIEF DESCRIPTION OF THE DRAWINGS

The invention will be better understood on reading the description which follows of several embodiments, and which is given solely by way of example while referring to the drawings in which.

DETAILED DESCRIPTION

The basic concept of the invention rests on a flexible payload architecture, compatible with the VHTS and HTS needs, and associating the following major elements:

a sub-system of multi-spot passive antennas;

a repeater core based on a digital transparent processor DTP of very high capacity dimensioned to meet the HTS and VHTS needs;

beam hopping operation of the payload.

Flexibility of this combination of major elements, which is compatible with the HTS and VHTS needs, is rendered possible by:

the provision of a digital transparent processor (DTP) having the capacity to process the totality of the traffic of a VHTS payload typically beyond 100 GHz whilst the hitherto existing technologies limited the processing capacity below the said value of 100 GHz; and the association of this digital processor with a use of beam hopping to generate the spots of "user terminal" type and thus offer each spot a capacity to access the whole allocated band.

Figure 1A:
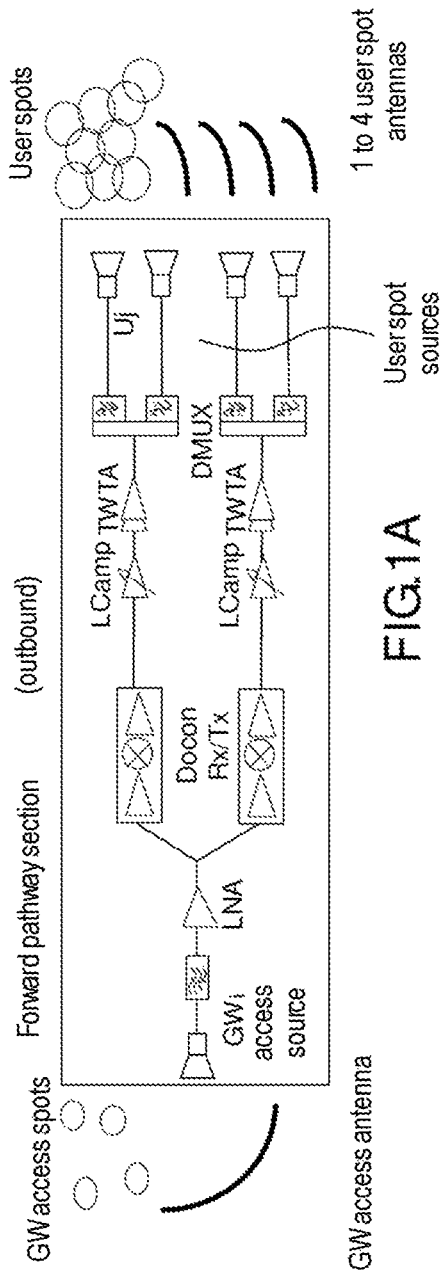
FIGS. 1A and 1B are respective views of a known conventional architecture of a forward pathway section and of a return pathway section of a multibeam telecommunications payload of HTS type.
Figure 1B:
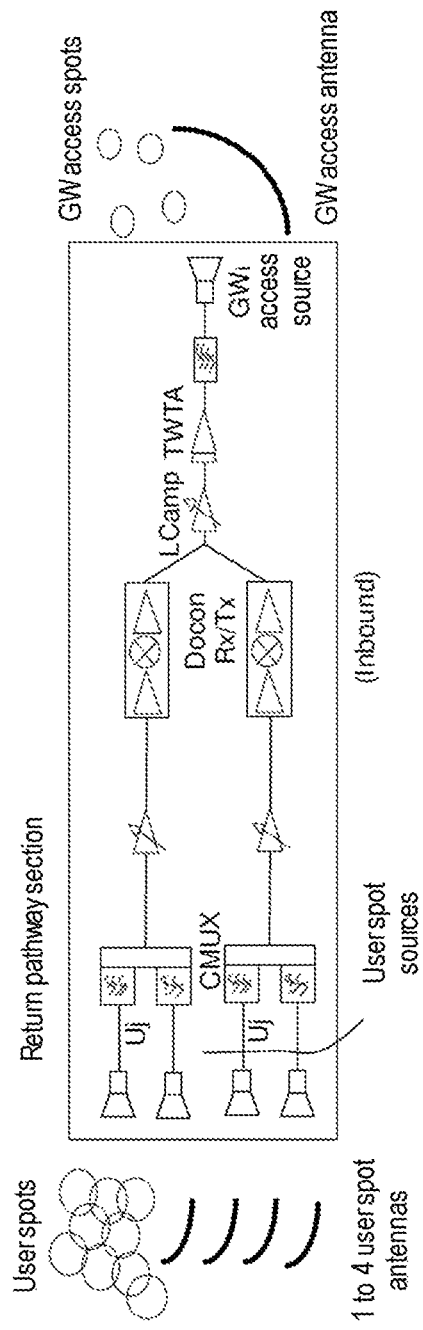

These major elements, taken in combination, form a telecommunications payload according to the invention which is different from the conventional payloads such as described for VHTS and HTS applications, in particular that described in FIGS. 1A and 1B.

Figure 2:
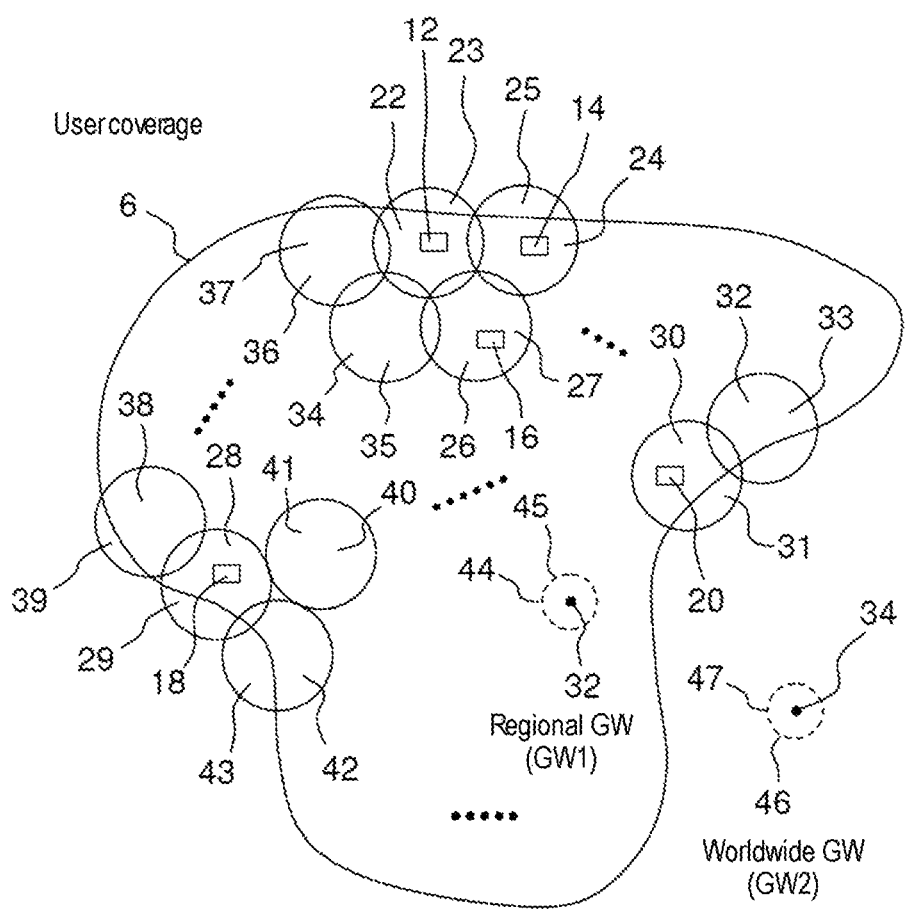
FIG. 2 is a view of a typical example of service coverage and of access implemented by a satellite and a multibeam telecommunications payload according to the invention for VHTS or HTS applications.

According to FIG. 2, a multibeam telecommunications payload according to the invention, not represented in FIG. 2, of VHTS or HTS type and in geostationary orbit on a satellite platform, is configured and dimensioned to serve in a service coverage 6 user terminals 12, 14, 16, 18, 20 in transmission and in reception respectively from and to the payload. The payload according to the invention is assumed here to be situated above and remote from FIG. 2, and to look towards the service coverage 6. The service coverage 6 is formed and tiled by a set of transmit and receive user spots, designated by the references 22, 24, 26, 28, 30, 32, 34, 36, 38, 40, 42 for the transmit spots and the references 23, 25, 27, 29, 31, 33, 35, 37, 39, 41, 43 for the receive spots. Here, only eleven user spots being represented in FIG. 2 for the sake of readability. To simplify the representation of FIG. 2, it is assumed here that the transmit and receive user spots are congruent, that is to say that to each satellite transmit spot 22, 24, 26, 28, 30, 32, 34, 36, 38, 40, 42 there corresponds a satellite receive spot 23, 25, 27, 29, 31, 33, 35, 37, 39, 41, 43 of the same radiation pattern. Transmit user spots can partially overlap one another and receive user spots can partially overlap one another. The user terminals 12, 14, 16, 18, 20 are respectively situated in the user spots 22, 24, 26, 28 and 30.

The multibeam telecommunications payload is configured to service for the forward pathway the user terminals 12, 14, 16, 18 and 20 on the basis of access stations 32, 34 GW ("GateWays") and to service for the return pathway the access stations 32, 34 on the basis of the user terminals 12, 14, 16, 18 and 20.

The access stations 32, 34 are serviced for the return pathway by the user terminals through transmit access spots 44, 46 in which the access stations are situated. The access stations 32, 34 service for the forward pathway the user terminals 12, 14, 16, 18 and 20 through receive access spots 45, 47.

To simplify the representation of FIG. 2, it is assumed here that the transmit 44, 46 and receive 45, 47 access spots GW are congruent. The access spots GW 44, 45, 46, 47 are defined by fine pencils and represented by dashed circles. The access station 32 is here a "regional" access station situated in the user coverage 6 tiled by the whole set of user spots while the station 34 is here a "worldwide" access station or another regional station, situated outside of any user coverage zone.

The transmit user spots 22, 24, 26, 28, 30, 32, 34, 36, 38, 40, 42 and receive user spots 23, 25, 27, 29, 31, 33, 35, 37, 39, 41, 43 are generated by a first passive antenna system of the payload while the transmit 44, 46 and receive 45, 47 access spots GW are generated by a second passive antenna system of the payload.

Figure 3:
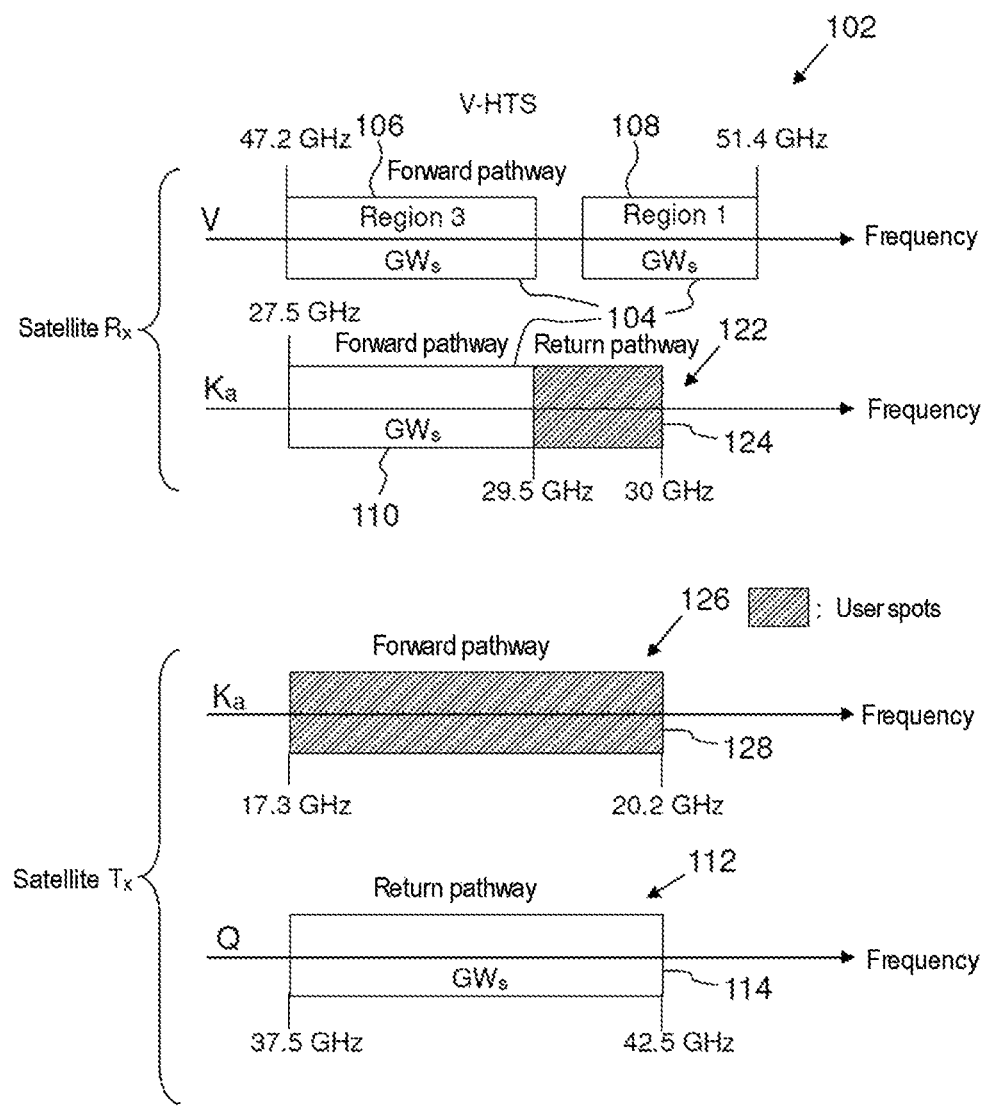
FIG. 3 is a view of an example of frequency plan of a multibeam telecommunications payload according to the invention of VHTS type.

According to FIG. 3, an example of VHTS frequency plan 102 of a multibeam telecommunications payload according to the invention of VHTS type is illustrated.

For the access links GW (i.e. GateWay), the VHTS Rx frequency plan (satellite receive) utilizes a first satellite receive Rx band 104 which uses V-band, lying between 47.2 GHz and 51.4 GHz, decomposed here into two sub-bands, a first sub-band 106 and a second sub-band 108, so as to limit the passband of each sub-band in reception, and which uses a part of the Ka-band as third sub-band 110, for example lying between 27.5 GHz and 29.5 GHz.

As a variant and another example, the third sub-band 110 is lying between 27.0 GHz and 29.5 GHz.

As a variant, other splittings of the V-band and of the Ka-band can be envisaged to form the first satellite receive reception band.

For the access links GW (i.e. GateWay), the VHTS Tx frequency plan (satellite transmit) utilizes a first satellite transmit Tx band 112 which uses a band Q part as fourth sub-band 114, lying between 37.5 GHz and 42.5 GHz.

For the user links, the frequency plan utilizes a second satellite receive Rx band 122 which uses a part of the Ka-band as fifth sub-band 124, lying between 29.5 GHz and 30 GHz, and utilizes a second satellite transmit Tx band 126 which uses a part of the Ka-band as sixth sub-band 128, lying between 17.3 GHz and 20.2 GHz.

Figure 4:
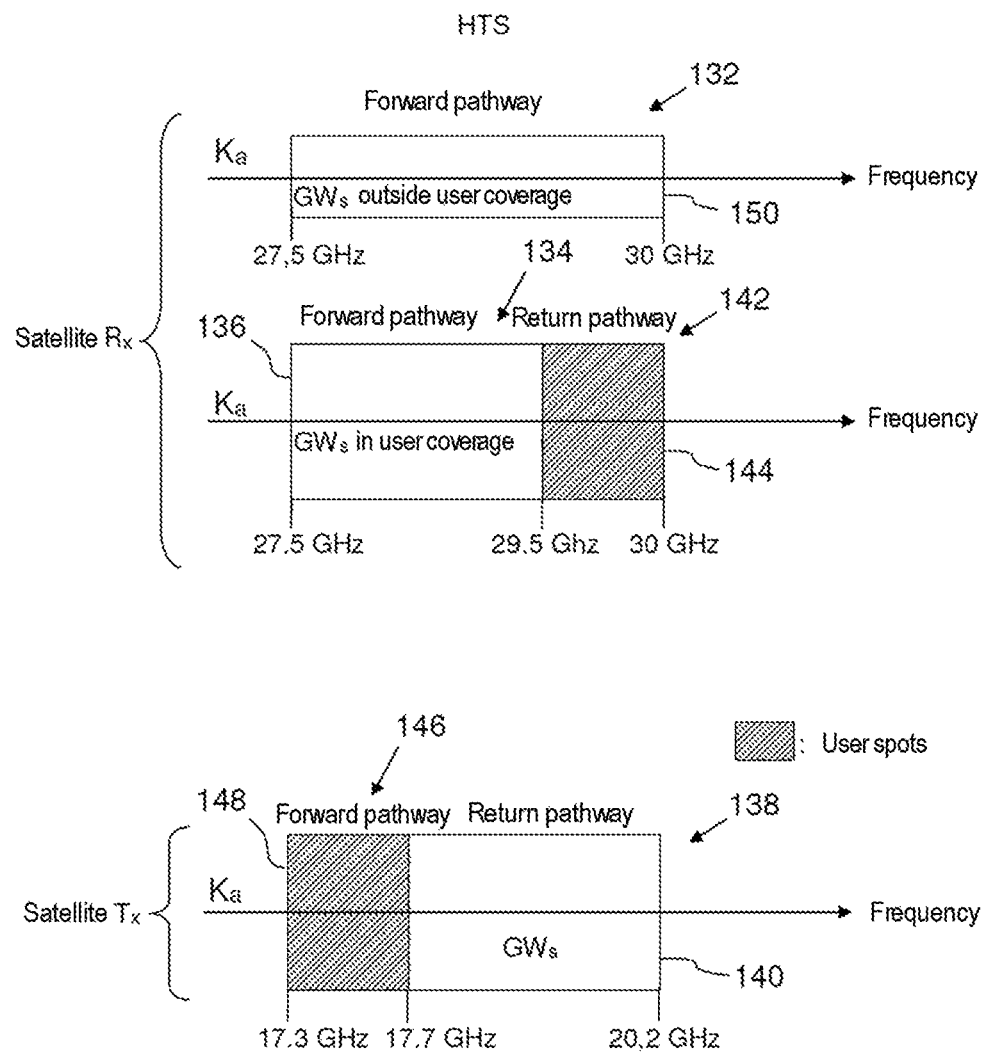
FIG. 4 is a view of an example of frequency plan of a multibeam telecommunications payload according to the invention of HTS type.

According to FIG. 4, an example of HTS frequency plan 132 of a multibeam telecommunications payload according to the invention of HTS type is illustrated.

For the access links GW, the HTS frequency plan (satellite receive) Rx utilizes a first HTS satellite receive Rx band 134 which uses here a part of the Ka-band as first sub-band 136, lying between 27.5 GHz and 29.5 GHz, and the frequency plan (satellite transmit) Tx utilizes a first HTS satellite transmit Tx band 138 which uses a part of the Ka-band as second sub-band 140, lying between 17.7 GHz and 20.2 GHz.

As a variant, the first sub-band 136 is lying between 27.0 GHz and 29.5 GHz.

For the user links, the HTS Rx frequency plan utilizes a second HTS satellite receive Rx band 142 which uses a part of the Ka-band as third sub-band 144, lying between 29.5 GHz and 30 GHz, and utilizes a second HTS satellite transmit Tx band 146 which uses a part of the Ka-band as fourth sub-band 148, lying between 17.3 GHz and 17.7 GHz.

It should be noted that when the access station is situated outside of the user coverage 6, the first satellite receive Rx band 134 can be extended into a band 150 lying between 27.5 GHz and 30 GHz. As a variant, the first satellite receive Rx band 134 can be extended into a band 150 lying between 27.0 GHz and 30 GHz.

Generally and independently of the type of multibeam telecommunications payload (VHTS or HTS), the first satellite receive Rx band can be decomposed according to a first suite into one or more sub-bands of one or more type(s) of band, the first satellite transmit Tx band can be decomposed according to a second suite into one or more sub-bands of one or more type(s) of band, the second satellite receive Rx band can be decomposed according to a third suite into one or more sub-bands of one or more type(s) of band, the second satellite transmit Tx band can be decomposed according to a fourth suite into one or more sub-bands of one or more type(s) of band, the first, second, third and fourth suites of sub-bands being compatible so as not to interfere with one another.

Figure 5:
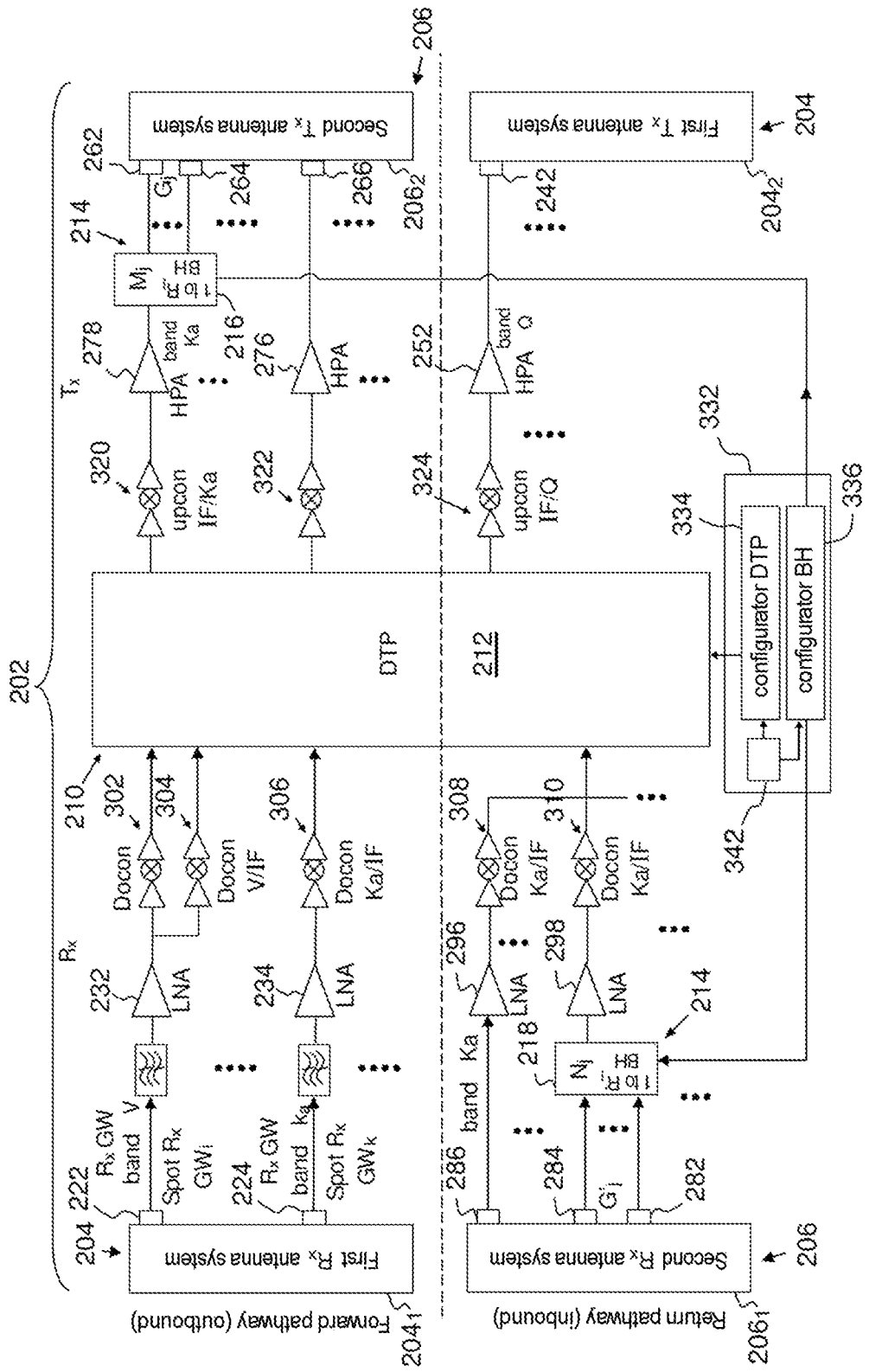
FIG. 5 is a view of a first embodiment of a multibeam telecommunications payload architecture which corresponds to VHTS applications.

According to FIG. 5 and a first architecture embodiment, a multibeam space telecommunications payload 202 according to the invention for VHTS applications comprises a first multibeam antenna system 204 of passive antennas with a receive Rx component $204_1$ and a transmit Tx component $204_2$, a second multibeam antenna system 206 of passive antennas with a receive Rx component $206_1$ and a transmit Tx component $206_2$, a digital core DTP 210 based on a digital transparent processor DTP 212, and a switching set 214 with radiofrequency RF beam hopping BH.

The first multibeam antenna system 204 of passive antennas is configured to receive from and transmit to the spots of access stations GW 45, 47; 44, 46 respectively in the first satellite receive Rx band 104 and the first satellite transmit Tx band 112 of the VHTS frequency plan of FIG. 3.

The second multibeam antenna system 206 of passive antennas is configured to receive from and transmit to the user coverage zone 6 respectively in the second satellite receive Rx band and the second satellite transmit Tx band of FIG. 3, by generating multiple satellite receive user spots, in particular the receive user spots 23, 25, 27, 29, 31, 33, 35, 37, 39, 41, 43 of FIG. 2, and multiple satellite transmit user spots, in particular the satellite transmit user spots 22, 24, 26, 28, 30, 32, 34, 36, 38, 40, 42 of FIG. 2.

The digital core DTP 210, based on the digital transparent processor DTP 212 is dimensioned through a sufficient number of accesses at input Rx and at output Tx so as to be connected: at input to all the receive Rx access spots of the access stations GW and to all the receive Rx user spots, and at output to all the transmit Tx user spots and to all the transmit Tx access spots of the access stations GW, and is configured to offer total connectivity and totally flexible frequency management. Having regard to the frequency plans to be covered the optimal solution consists in considering a processor capable of managing up to 2.9 GHz per access and to have a number of input accesses and of output accesses which are capable of interconnecting all the spots of "user terminal" type and all the spots of "access station" type.

According to FIG. 5, the RF BH switching set 214 is made up of one or more BH matrices of RF switches, here a transmit BH matrix Mj designated by the numerical reference 216 and a receive BH matrix Nj designated by the numerical reference 218, wired up respectively in satellite transmit Tx on transmit Tx user spot source accesses and in satellite receive Rx on receive Rx user spot source accesses, to implement operation by beam hopping on clusters Gj/G'j of Tx and/or Rx user spots for which the number of spots Rj (for the Tx user spots), R'j (for the Rx user spots) is less than or equal to the total number P of access station spots.

As a variant, the RF BH switching set is made up of one or more matrices of RF switches wired up to source accesses of user spots in satellite transmit Tx only.

Generally, the first and second antenna systems of the VHTS multibeam payload are configured to generate user spots and access spots in the general case of a VHTS frequency plan such as described in FIG. 3, that is to say in the general case where the first receive Rx band comprises the reception of the V-band, lying between 47.2 GHz and 51.4 GHz, divided into one or more sub-band(s) (typically two sub-bands, first and second), and/or the reception of a part of the Ka-band as third sub-band, included in the interval lying between 27.5 GHz and 29.5 GHz.

According to FIG. 5, the first multibeam antenna system 204 comprises, in its receive component $204_1$, an integer number P of accesses 222, 224 to the receive spots of the access stations GW equal to the total number of access stations GW and is configured so that each access station GW receive spot services a single access station. Here for example, the access 222 is the access corresponding to the receive spot 47 of the "worldwide" access station 34 and using the first and second sub-bands in the V-band of the first satellite receive band 104, and the access 224 is the access corresponding to the receive spot 45 of the "regional" access station 32 using the third sub-band in the Ka-band of the first satellite receive Rx band 104.

Generally, the number P of access stations and therefore of access station receive Rx spot accesses is greater than or equal to 2.

The VHTS multibeam payload 202 furthermore comprises a set of first low noise amplifiers LNA whose number is equal to the total number P of access stations GW, each LNA being connected between the single access of a satellite Rx receive spot of a different access station and an input of the digital transparent processor DTP 212.

Here, two first amplifiers LNAs 232, 234 are alone represented in FIG. 5 and are respectively connected to the accesses 222, 224 of the satellite Rx receive spots of the access stations 34, 32.

Generally, the number P of first amplifiers LNA is greater than or equal to 2.

The first multibeam antenna system 204 in its transmit Tx component $204_2$ comprises a number of accesses to the transmit spots of the access stations GW which is equal to the total number P of access stations GW and is configured so that each access station transmit spot services a single access station GW. Here a single access 242 is represented; this access corresponds to the transmit access spot 46 of the "worldwide" access station 34 and uses the fourth sub-band 114 in the Q-band of the first Tx access band 112.

The VHTS multibeam payload 202 furthermore comprises a second set of second power amplifiers HPA whose number is equal to the total number P of access stations GW, each second power amplifier HPA being connected between the single access of a transmit Tx spot of a different access station GW and an output of the digital transparent processor DTP 212.

Here, only one second power amplifier HPA 252 from among the P amplifiers HPA is represented, being connected to the access 242 of the transmit access spot 46 of the "worldwide" access station 34.

According to FIG. 5, the second multibeam antenna system 206 comprises in its transmit component $206_2$ an integer number N of source accesses 262, 264, 266 to the satellite transmit user spots, only three accesses being represented here for the sake of simplicity of FIG. 5.

The VHTS multibeam payload 202 comprises a number K1 of third RF power amplifiers HPA 276 connected directly to K1 source accesses to the satellite transmit user spots taken from among the N transmit user spot accesses, K1 being an integer number less than or equal to N−1, and a non-zero number K2 of third RF power amplifier(s) HPA 278 connected to the N−K1 remaining transmit user spot source accesses through K2 switching matrices Mj, each allowing the implementation of beam hopping on a different cluster Gj of Tx user spots whose number of transmit spots Rj is greater than or equal to 2 and less than or equal to the total number P of spots of access stations GW, the integer numbers N, K1, K2 and Rj, j varying from 1 to K2 satisfying the relation:

$$N = K1 + \Sigma_{j=1}^{K2} R_j$$

It should be noted that in the case where none of the source accesses to the transmit user spots is linked to a transmit BH switching matrix, the number K1 is equal to N and the number K2 is equal to 0.

According to FIG. 5, the second multibeam antenna system 206 comprises in its receive component 206₁ an integer number of source accesses 282, 284, 286 to the satellite receive user spots which is equal to the number N.

The VHTS multibeam payload 202 comprises a number K'1 of fourth RF low noise amplifier(s) LNA 296 connected directly to K1 source accesses to the satellite receive source user spots taken from among the N receive user spot accesses, K1 being identical to the number K1 of third RF power amplifiers connected directly to the transmit user spot source accesses, and a number K'2 of fourth RF low noise amplifier(s) LNA 298 connected to the N–K'1 remaining transmit user spot source accesses through K'2 switching matrices Nj, each allowing the implementation of beam hopping on a different cluster G'j of Rx user spots whose number of receive spots R'j is greater than or equal to 2 and less than or equal to the total number P of access station GW receive spots, the integer numbers N, K'1, K'2 and R'j, j varying from 1 to K'2 satisfying the relation:

$$N = K'1 + \Sigma_{j=1}^{K'2} R'_j$$

It should be noted that in the case where none of the source accesses to the receive user spots is linked to a receive BH switching matrix, the number K'1 is equal to N and the number K'2 is equal to 0.

It should be noted that as a variant the VHTS multibeam payload might not comprise any receive BH switching matrix while in the general case the VHTS multibeam payload always comprises a transmit BH switching matrix. Indeed, if the needs of the system want to limit the beam hopping operation on the forward or outbound links only, it is possible to have a receive Rx distribution frequency for the user spots and thus to avoid beam hopping operation on the return pathways.

According to FIG. 5, the VHTS multibeam payload 202 also comprises conversion chains 302, 304, 306, 308, 310, 320, 322, 324, connected around the digital transparent processor DTP 212, and configured to interface the RF components of the payload operating in the first and second transmit Tx and receive Rx bands (Ka, V & Q) and inputs and outputs of the transparent digital processor DTP 212 operating at a useful intermediate frequency compatible with the useful-band widths managed by access in reception and in transmission of the processor. It should be noted that if the digital core 210 of the VHTS payload 202, that is to say the DTP 212, is capable of carrying out digital sampling directly at the RF frequencies in the first and second bands, in receive mode and in transmit mode, it is not necessary to use frequency converters.

The digital transparent processor DTP 212 is configured to create frequency paths characterized by a connectivity between the access spots GW and the user spots for the forward pathway and between the user spots and the access spots GW for the return pathway, and a frequency plan taking into account a traffic need and frequency coordination constraints.

Each matrix Mj, Nj, of RF switches on source accesses of user spots in satellite transmit Tx only or in satellite transmit Tx and in satellite receive Rx, part of the RF BH switching set 214, is configured to distribute temporally, in satellite transmit Tx the signal amplified by the power amplifier directly connected upstream of the matrix Mj on the user spots according to a predetermined transmit Tx temporal allocation plan for transmit time slots, and in satellite receive Rx the signals of the user spots connected to one and the same matrix Nj on the low noise amplifier directly connected downstream of the said matrix Nj according to a predetermined receive Rx temporal allocation plan for receive time slots.

According to FIG. 5, the VHTS multibeam payload 202 also comprises a calculator or a set of several calculators for management and control, designated by the numerical reference 332, to configure with the aid of a first configurator processor or of a first configurator software module 334 for DTP in a static or dynamic manner the digital processor DTP 212, and to configure, with the aid of a second configurator processor or of a second configurator software module 336 for beam hop(s), the BH switch matrix or matrices 214, 216 for the implementation of their beam hops.

The digital processor DTP 212 is configured in terms of a matrix of connectivity from the access spots GW to the user spots for the forward pathway and from the user spots to the access spots for the return pathway and in terms of a frequency plan.

The BH switch matrix or matrices 214, 216, 218 is or are configured to implement beam hops in terms of a transmit Tx temporal allocation plan, or in terms of a transmit Tx temporal allocation plan and of a receive Rx temporal allocation plan.

The connectivity matrix, the frequency plan and the temporal allocation plan(s) depend on the spatial and temporal distribution of the traffic demand as a whole of the user spots and frequency coordination constraints.

According to FIG. 5, the VHTS multibeam payload 202 also comprises a memory 342 of configurations of the digital processor DTP 212 and of the BH switch matrix or matrices 214, 216, 218, in which different configurations in terms of triplets, each made up of a connectivity matrix, a frequency plan, a transmit Tx temporal allocation plan, or of quadruplets each made up of a connectivity matrix, a frequency plan, a transmit Tx temporal allocation plan and a receive Rx temporal allocation plan, the configurations being activatable at different instants forming a configurations activation sequence.

Thus, the calculator or the set of several calculators for management and control 332 is able to manage and control, in a static or dynamic manner, on the one hand the digital transparent processor DTP 212 in terms of connectivity plan and of frequency plan, and on the other hand the matrix 216 or the two matrices of RF switches 216, 218 in terms of the sequence or sequences for controlling the beam hops in transmission only, or in transmission and reception.

The digital transparent processor DTP 212 is configured to provide total flexibility in terms of passband allocation to the user spots as a function of the traffic needs without overdimensioning the number of access stations GW.

Each transmit BH switch matrix Mj 216, connected to a single power amplifier HPA 278 and associated with a group Gj of transmit user spots, is configured to connect in turn a transmit user spot of the group Gj to the power amplifier HPA and allow it to receive the entire band amplified by the said HPA. At the same time, the digital transparent processor DTP 212 is configured to load each amplifier HPA 278, connected to a transmit BH switch matrix Mj 216, with the frequency bands actually available on account of possible coordination constraints for the set Gj of transmit user spots connected to the same HPA.

The digital transparent processor DTP 212 is configured to load each amplifier HPA, connected to a transmit BH switch matrix Mj, with the quantity of frequency band required to meet the temporal traffic variations demanded of the transmit user spots of the group Gj that are connected to the corresponding power amplifier HPA. At the same time, the transmit BH switch matrices Mj 216 are configured for beam hopping with possible modulation of the temporal sharing of the time between the spots of one and the same group Gj that are connected to one and the same HPA so as to supplement the capability of the DTP 212 to allocate more or less band and to meet the faster traffic variations which the DTP cannot meet.

The digital transparent processor DTP 212 and the beam hopping switch matrices 216, 218 are configured to connect several Rx access station access spots to one and the same Tx user spot while ensuring independent management of the gains of channels arising from each access station GW connected to the said same transmit user spot.

Thus, the VHTS multibeam payload 202 such as described in FIG. 5 advantageously offers the following capabilities and capacities:

total flexibility in terms of passband allocation to the user spots as a function of the traffic needs without having to overdimension the number of access station GW, this functionality being offered by the DTP 212 which offers an unequalled capacity to allocate the required band to each HPA serving one or more user spots, and the capacity to load each HPA more or less according to the traffic need;

a capability to offer the entire band available to each user spot and to avoid frequency coordination problems, this avoidance being rendered possible by virtue:

of a beam hopping BH operation which allows each user spot connected to one and the same HPA to receive the entire band amplified by the HPA, and of the capacity of the DTP 212 to load each HPA with the frequency bands actually available (a limitation possibly occurring on account of possible coordination constraints) for the spots connected to the same HPA.

The VHTS multibeam payload 202 such as described in FIG. 5 also and advantageously offers the following capabilities and capacities:

a capacity for dynamically varying the capacity allocated to each user spot according to the variations in traffic demand by virtue:

on the one hand of the DTP which loads each HPA with the quantity of frequency band required to meet the needs of the user spots connected to the said HPA, for example to meet daily traffic variations, and on the other hand of the BH operation offered by the BH matrix 216 of switches and of the allowed temporal sharing of the time between the user spots connected to one and the same HPA which supplements the capability of the DTP 212 to allocate more or less frequency band and which can be used for traffic variations that are faster than those compensated by the DTP 212;

a rationalization of the number of access stations GWs by virtue of a payload architecture which allows a dimensioning on the capacity actually demanded and not on the sum of the capacity maximums which may potentially be seen by the user spots;

a capability for progressive rollout of the transmission capacity with a minimum of access stations GW used when starting to put the telecommunications system into service while being able to serve the user spots as regards demand for transmission resources; the DTP 212 offers the possibility of serving all the user spots with a single access station GW;

a capability to effect links of internal network or "mesh" type making it possible to directly connect certain user spots together or certain access spots GW together at the on-board level of the payload without passing via the ground;

the capacity to connect several access stations GW to one and the same user spot while ensuring independent management of the gains of the channels arising from each access station.

The VHTS multibeam payload 202 such as described in FIG. 5 offers further and advantageously the following capabilities and capacities:

a multicast and broadcast capacity in respect of the channels received, thereby offering maximum capacity for rationalization of the band with respect to the known VHTS payload architectures, an improved capacity for monitoring the totality of the traffic which will travel in the DTP by the spectral analysis of the spectra received and transmitted.

Figure 6:
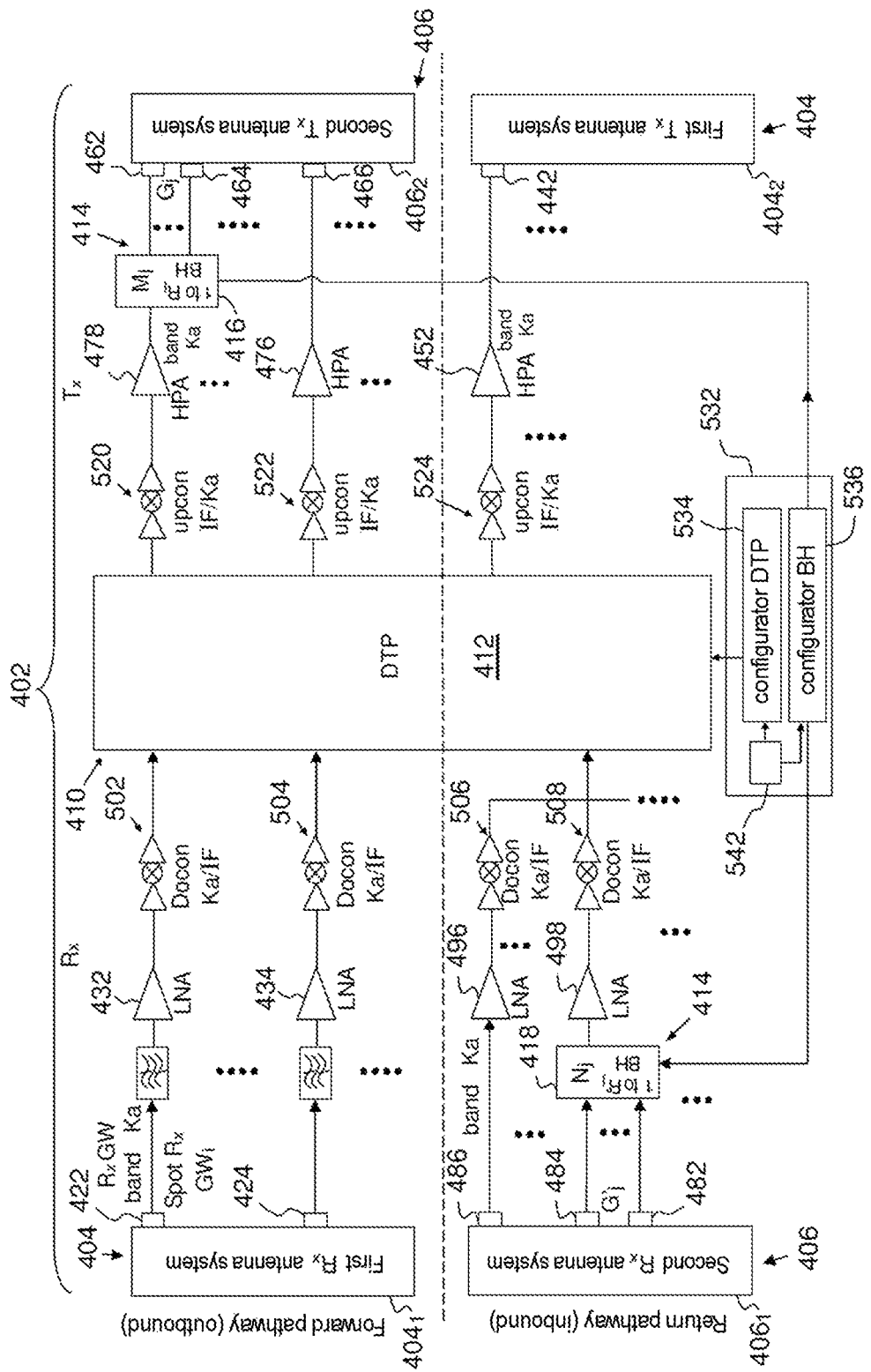
FIG. 6 is a view of a second embodiment of a multibeam telecommunications payload architecture which corresponds to HTS applications.

According to FIG. 6 and a second architecture embodiment, a multibeam space telecommunications payload 402 according to the invention for HTS applications comprises a first multibeam antenna system 404 of passive antennas with a receive Rx component $404_1$ and a transmit Tx component $404_2$, a second multibeam antenna system 606 of passive antennas with a receive Rx component $406_1$ and a transmit Tx component $406_2$, a digital core DTP 410 based on a digital transparent processor DTP 412, and a radiofrequency RF beam hopping BH switching set 414.

The first multibeam antenna system 404 of passive antennas is configured to receive from and transmit to the spots of access stations GW 45, 47; 44, 46 respectively in the first satellite receive Rx band 134 and the first satellite transmit Tx band 138 of the HTS frequency plan 132 of FIG. 4.

The second multibeam antenna system 406 of passive antennas is configured to receive from and transmit to the user coverage zone 6 respectively in the second satellite receive Rx band and the second satellite transmit Tx band of FIG. 4, by generating multiple satellite receive user spots, in particular the receive user spots 23, 25, 27, 29, 31, 33, 35, 37, 39, 41, 43 of FIG. 2, and multiple satellite transmit user spots, in particular the satellite transmit user spots 22, 24, 26, 28, 30, 32, 34, 36, 38, 40, 42 of FIG. 2.

The digital core DTP 410, based on the digital transparent processor DTP 412 is dimensioned through a sufficient number of accesses at input Rx and at output Tx so as to be connected: at input to all the receive Rx access spots of the access stations GW and to all the receive Rx user spots, and at output to all the transmit Tx user spots and to all the transmit Tx access spots of the access stations GW, and is configured to offer total frequency connectivity. Having regard to the frequency plan to be covered the optimal solution consists here in considering a processor capable of managing up to 2.9 GHz per access and of having a number of input accesses and outputs capable of connecting all the spots of "user terminal" type and all the spots of "access station" type.

It should be noted that in the case of a frequency plan offering further frequency resources, the processor management capacity will have to be extended.

According to FIG. 6, the RF BH switching set 414 is made up of one or more BH matrices of RF switches, here a transmit BH matrix Mj designated by the numerical reference 416 and a matrix Nj designated by the numerical reference 418, wired up respectively in satellite transmit Tx on transmit Tx user spot source accesses and in satellite receive Rx on receive Rx user spot source accesses, so as to implement operation by beam hopping on clusters Gj/G'j, of Tx and/or Rx user spots for which the number of spots Rj, R'j is less than or equal to the total number P of access station spots.

As a variant, the RF BH switching set is made up of one or more matrices of RF switches on source accesses of user spots in satellite transmit Tx only.

According to FIG. 6, the first multibeam antenna system 404 in its receive component $404_1$ comprises an integer number P of accesses 422, 424 to the receive spots of the access stations GW equal to the total number of access stations GW and is configured so that each access station GW receive spot services a single access station. Here, for example, the access 622 is the access corresponding to the receive spot 47 of the "worldwide" access station 34 and using the first sub-band in the Ka-band of the first Rx band, and the access 424 is the access corresponding to the receive access spot 45 of the "regional" access station 32 using the sub-band in the Ka-band 148 of the first satellite receive Rx band 146.

Generally, the number P of access stations and therefore of access station receive Rx spot accesses is greater than or equal to 2.

The VHTS multibeam payload 402 furthermore comprises a set of first low noise amplifiers LNA whose number is equal to the total number P of access stations GW, each LNA being connected between the single access of a satellite Rx receive spot of a different access station and an input of the digital transparent processor DTP 412.

Here, two first amplifiers LNAs 432, 434 are alone represented in FIG. 6 and are respectively connected to the accesses 422, 424 of the satellite Rx receive spots of the access stations 34, 32.

Generally, the number P of first amplifiers LNA is greater than or equal to 2.

The first multibeam antenna system 404 in its transmit Tx component $404_2$ comprises a number of accesses to the transmit spots of the access stations GW which is equal to the total number P of access stations GW and is configured so that each access station transmit spot services a single access station GW. Here a single access 442 is represented; this access corresponds to the transmit access spot 46 of the "worldwide" access station 34 and uses the third sub-band 148 in the Ka-band of the first Tx access band 146.

The HTS multibeam payload 402 furthermore comprises a second set of second power amplifiers HPA whose number is equal to the total number P of access stations GW, each second power amplifier HPA being connected between the single access of a transmit Tx spot of a different access station and an output of the digital transparent processor DTP 412.

Here, only one second power amplifier HPA 452 from among the P amplifiers HPA is represented, being connected to the access 442 of the transmit spot of 46 of the access station 34.

According to FIG. 6, the second multibeam antenna system 406 comprises in its transmit component $406_2$ an integer number N of source accesses 462, 464, 466 to the satellite transmit user spots, only three accesses being represented for the sake of simplicity of FIG. 6.

The VHTS multibeam payload 402 comprises a number K1 of third RF power amplifiers HPA 476 connected directly to K1 source accesses to the satellite transmit user spots taken from among the N transmit user spot accesses, K1 being an integer number less than or equal to N−1, and a non-zero number K2 of third RF power amplifier(s) HPA 478 connected to the N−K1 remaining transmit user spot source accesses through K2 switching matrices Mj, each allowing the implementation of beam hopping on a different cluster Gj of Tx user spots whose number of transmit spots Rj is greater than or equal to 2 and less than or equal to the total number P of spots of access stations GW, the integer numbers N, K1, K2 and Rj, j varying from 1 to K2 satisfying the relation:

$$N = K1 + \Sigma_{j=1}^{K2} R_j$$

It should be noted that in the case where none of the source accesses to the transmit user spots is linked to a transmit BH switching matrix, the number K1 is equal to N and the number K2 is equal to 0.

According to FIG. 6, the second multibeam antenna system 406 comprises in its receive component $406_1$ an integer number of source accesses 482, 484, 486 to the satellite receive transmit user spots which is equal to the number N.

The VHTS multibeam payload 402 comprises a number K'1 of fourth RF low noise amplifier(s) LNA 496 connected directly to K1 source accesses to the satellite receive source user spots taken from among the N receive user spot accesses, K1 being identical to the number K1 of third RF power amplifiers connected directly to the transmit user spot source accesses, and a number K'2 of fourth RF low noise amplifier(s) LNA 498 connected to the N−K'1 remaining transmit user spot source accesses through K'2 switching matrices Nj, each allowing the implementation of beam hopping on a different cluster G'j of Rx user spots whose number of receive spots R'j is greater than or equal to 2 and less than or equal to the total number P of access station GW receive spots, the integer numbers N, K'1, K'2 and R'j, j varying from 1 to K'2 satisfying the relation:

$$N = K'1 + \Sigma_{j=1}^{K2} R'_j$$

It should be noted that in the case where none of the source accesses to the receive user spots is linked to a switching matrix, the number K'1 is equal to N and the number K'2 is equal to 0.

It should be noted that as a variant the HTS multibeam payload might not comprise any receive BH switching matrix while in the general case the HTS multibeam payload always comprises a transmit BH switching matrix. Indeed, if the needs of the system want to limit the beam hopping operation on the forward or outbound links only, it is possible to have a receive Rx frequency distribution for the user spots and thus to avoid beam hopping operation on the return pathways.

According to FIG. 6, the HTS multibeam payload 402 also comprises conversion chains 502, 504, 506, 508, 520, 522, 524, connected around the digital transparent processor DTP 412, and configured to interface the RF components of the payload operating in the first and second transmit Tx and receive Rx bands (Ka only) and inputs and outputs of the transparent digital processor DTP 412 operating at a useful intermediate frequency compatible with the useful-band widths managed by access in reception and in transmission of the processor. It should be noted that if the digital core 410 of the payload HTS 402, that is to say the DTP 412, is capable of carrying out digital sampling directly at the RF frequencies in the first and second bands, in receive mode and in transmit mode, it is not necessary to use frequency converters.

The digital transparent processor DTP 412 is configured to create frequency paths characterized by a connectivity between the access spots GW and the user spots for the forward pathway and between the user spots and the access spots GW for the return pathway, and a frequency plan taking into account a traffic need and frequency coordination constraints.

Each matrix Mj, Nj, of RF switches on source accesses of user spots in satellite transmit Tx only or in satellite transmit Tx and in satellite receive Rx, part of the RF BH switching set 414, is configured to distribute temporally, in satellite transmit Tx the signal amplified by the power amplifier directly connected upstream of the matrix Mj on the user spots according to a predetermined transmit Tx temporal allocation plan for transmit time slots, and in satellite receive Rx the signals of the user spots connected to one and the same matrix Nj on the low noise amplifier directly connected downstream of the said matrix Nj according to a predetermined receive Rx temporal allocation plan for receive time slots.

According to FIG. 6, the VHTS multibeam payload 402 also comprises a calculator or a set of several calculators for management and control, designated by the numerical reference 532, so as to configure with the aid of a first configurator processor or of a first configurator software module 534 for DTP in a static or dynamic manner the digital processor DTP 412, and to configure, with the aid of a second configurator processor or of a second configurator software module 536 for beam hopping, the BH switch matrix or matrices 414, 416 for the implementation of their beam hops.

The digital processor DTP 412 is configured in terms of a matrix of connectivity from the access spots GW to the user spots for the forward pathway and from the user spots to the access spots for the return pathway and in terms of a frequency plan.

The BH switch matrix or matrices 414, 416, 418 is or are configured to implement beam hops in terms of a transmit Tx temporal allocation plan, or in terms of a transmit Tx temporal allocation plan and of a receive Rx temporal allocation plan.

The connectivity matrix, the frequency plan and the temporal allocation plan(s) depend on the spatial and temporal distribution of the traffic demand as a whole of the user spots and frequency coordination constraints.

According to FIG. 6, the HTS multibeam payload 402 also comprises a memory 542 of configurations of the digital processor DTP 412 and of the BH switch matrix or matrices 414, 416, 418, in which different configurations in terms of triplets, each made up of a connectivity matrix, a frequency plan, a transmit Tx temporal allocation plan or of quadruplets each made up of a connectivity matrix, a frequency plan, a transmit Tx temporal allocation plan and a receive Rx temporal allocation plan, the configurations being activatable at different instants forming a configurations activation sequence.

Thus, the calculator or the set of several calculators for management and control 432 is able to manage and control, in a static or dynamic manner, on the one hand the digital transparent processor DTP 412 in terms of connectivity plan and of frequency plan, and on the other hand the matrix 416 or the two matrices of RF switches 416, 418 in terms of the sequence or sequences for controlling the beam hops in transmission only, or in transmission and reception.

The digital transparent processor DTP 412 is configured to provide total flexibility in terms of passband allocation to the user spots as a function of the traffic needs without overdimensioning the number of access stations GW.

Each transmit BH switch matrix Mj 416, connected to a single power amplifier HPA 478 and associated with a group Gj of transmit user spots, is configured to connect in turn a transmit user spot of the group Gj to the power amplifier HPA and allow it to receive the entire band amplified by the said HPA. At the same time, the digital transparent processor DTP 412 is configured to load each amplifier HPA 478, connected to a transmit BH switch matrix Mj 416, with the frequency bands actually available on account of possible coordination constraints for the set Gj of transmit user spots connected to the same HPA.

The digital transparent processor DTP 412 is configured to load each amplifier HPA, connected to a transmit BH switch matrix Mj, with the quantity of frequency band required to meet the temporal traffic variations demanded of the transmit user spots of the group Gj that are connected to the corresponding power amplifier HPA. At the same time, the transmit BH switch matrices Mj 416 are configured for beam hopping with possible modulation of the temporal sharing of the time between the spots of one and the same group Gj that are connected to one and the same HPA so as to supplement the capability of the DTP 412 to allocate more or less band and to meet the faster traffic variations which the DTP cannot meet.

The digital transparent processor DTP 412 and the beam hopping switch matrices 416, 418 are configured to connect several Rx access station access spots to one and the same Tx user spot while ensuring independent management of the gains of channels arising from each access station GW connected to the said same transmit user spot.

Thus, the HTS multibeam payload 402 such as described in FIG. 6 advantageously offers the same capabilities and capacities as those offered by the VHTS multibeam payload 502.

Figure 7:
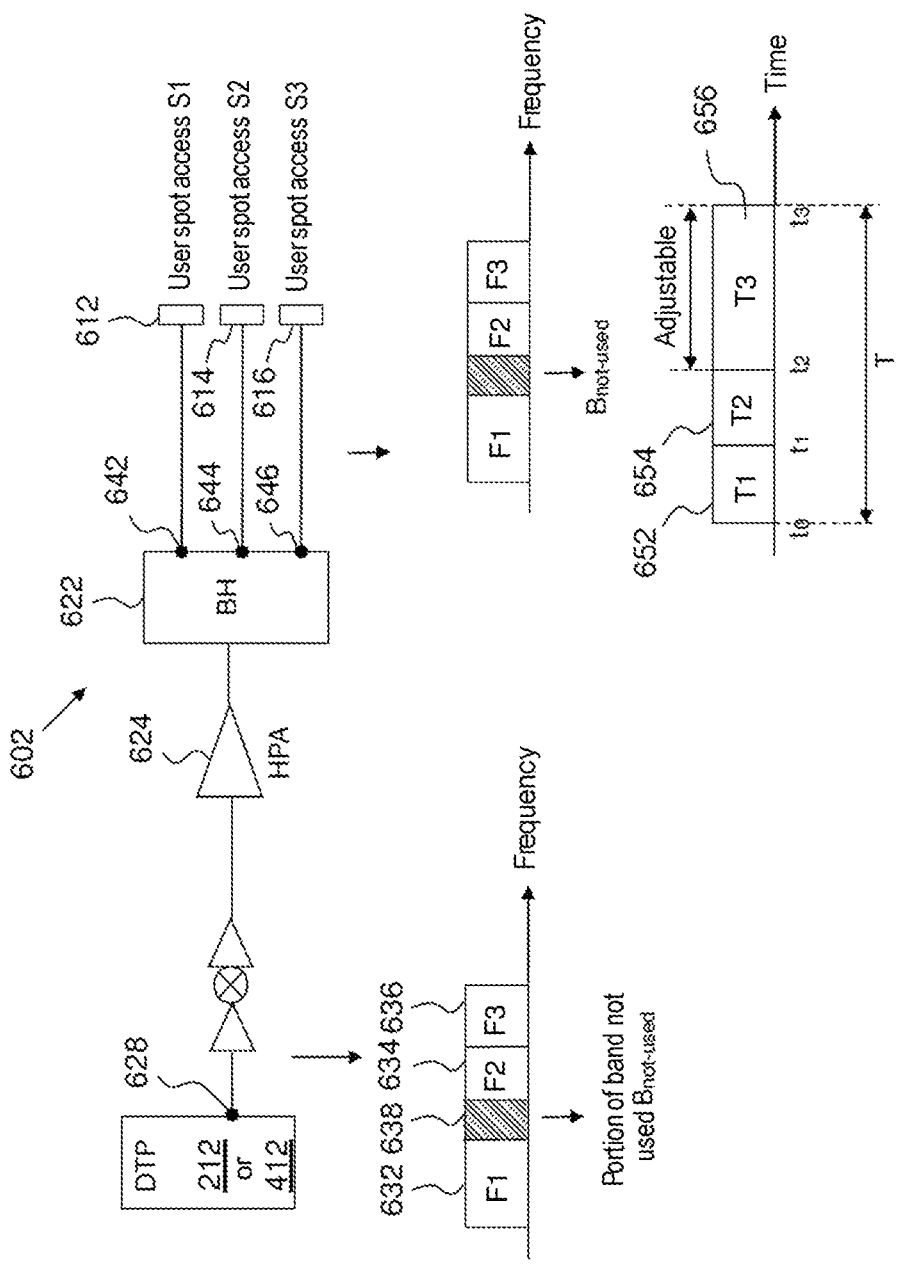
FIG. 7 is a view of a first particular exemplary configuration allowed by the multibeam payload according to the invention of FIGS. 4 and 5 in which three transmit user spots S1, S2, S3, forming a group or aggregate in beam hopping mode, are fed through a BH switching matrix with three outputs by a common power amplifier HPA, itself fed by an output of the digital transparent processor DTP, the output being serviced at least partially by an input of the DTP hooked up to the corresponding access of an access station GW, this servicing of the three transmit user spots S1, S2, S3 being implemented advantageously through the flexibility offered by the association of the DTP and of the BH switching matrix to satisfy here a regulatory restriction on the use of the frequencies and the dynamic and geographical variation of the traffic demand of the transmit user spots S1, S2 and S3.

According to FIG. 7 and a first particular exemplary configuration 602 allowed by the multibeam payload according to the invention of FIGS. 4 and 5, three transmit user spots S1, S2, S3, forming a group or aggregate in beam hopping mode, are respectively fed at their transmit spot accesses 612, 614, 616 through a BH switching matrix 622 with three outputs by a common power amplifier HPA 624, itself fed by an output 628 of the digital transparent processor DTP 212, 412, the output being serviced at least partially by an input (not represented in FIG. 7) of the DTP which is connected to the corresponding access of an access station GW, this servicing of the three transmit user spots S1, S2, S3 being implemented advantageously through the flexibility offered by the association of the DTP and of the BH switching matrix 622 to satisfy here a regulatory restriction of use of the frequencies and a dynamic and geographical variation of the traffic demand.

The DTP 212, 412 is here configured to provide at the output 628 a signal shared as frequency slots 632, 634, 636 corresponding to frequencies F1, F2 and F3, the shared signal using the entire band allocated to the user spots with the exception of a band portion 638, removed so as to satisfy regulatory constraints in respect of frequency coordination.

The BH switching matrix 622 is here configured to provide on its three outputs 642, 644, 646 the signal shared according to time slots 652, 654, 656 noted T1, T2 and T3 with T1 time duration for spot S1, T2 time duration for spot S2 and T3 time duration for spot S3.

This exemplary configuration shows the high degree of flexibility offered in terms of connectivity and dynamic allocation of the transmission resources in compliance with the regulatory frequency coordination constraints.

Figure 8:
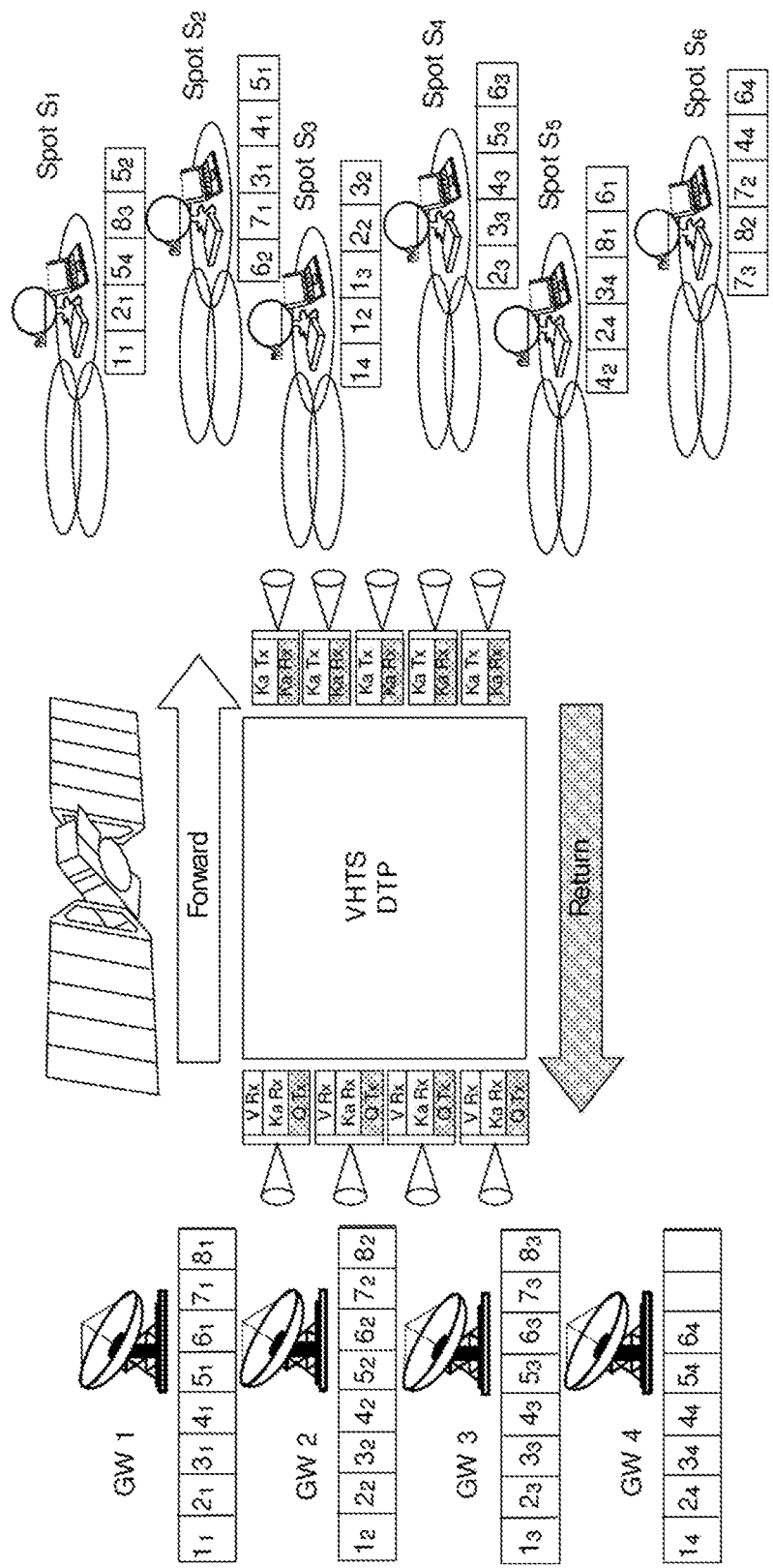
FIG. 8 is a view of a second particular exemplary configuration allowed by the multibeam payload according to the invention of FIGS. 4 and 5 which shows the flexibility afforded by the digital processor in terms of connectivity between the access spots GW and the user spots and in terms of frequency plan.

According to FIG. 8 and a second particular exemplary configuration allowed by the multibeam payload according to the invention of FIGS. 4 and 5, the flexibility afforded here by the digital processor in terms of connectivity between the access spots GW, here four access spots GW1, GW2, GW3, GW4, and user spots, here four user spots S1, S2, S3, S4, and in terms of frequency plan, makes it possible to rationalize the number of connection stations to be used.

Figure 9:
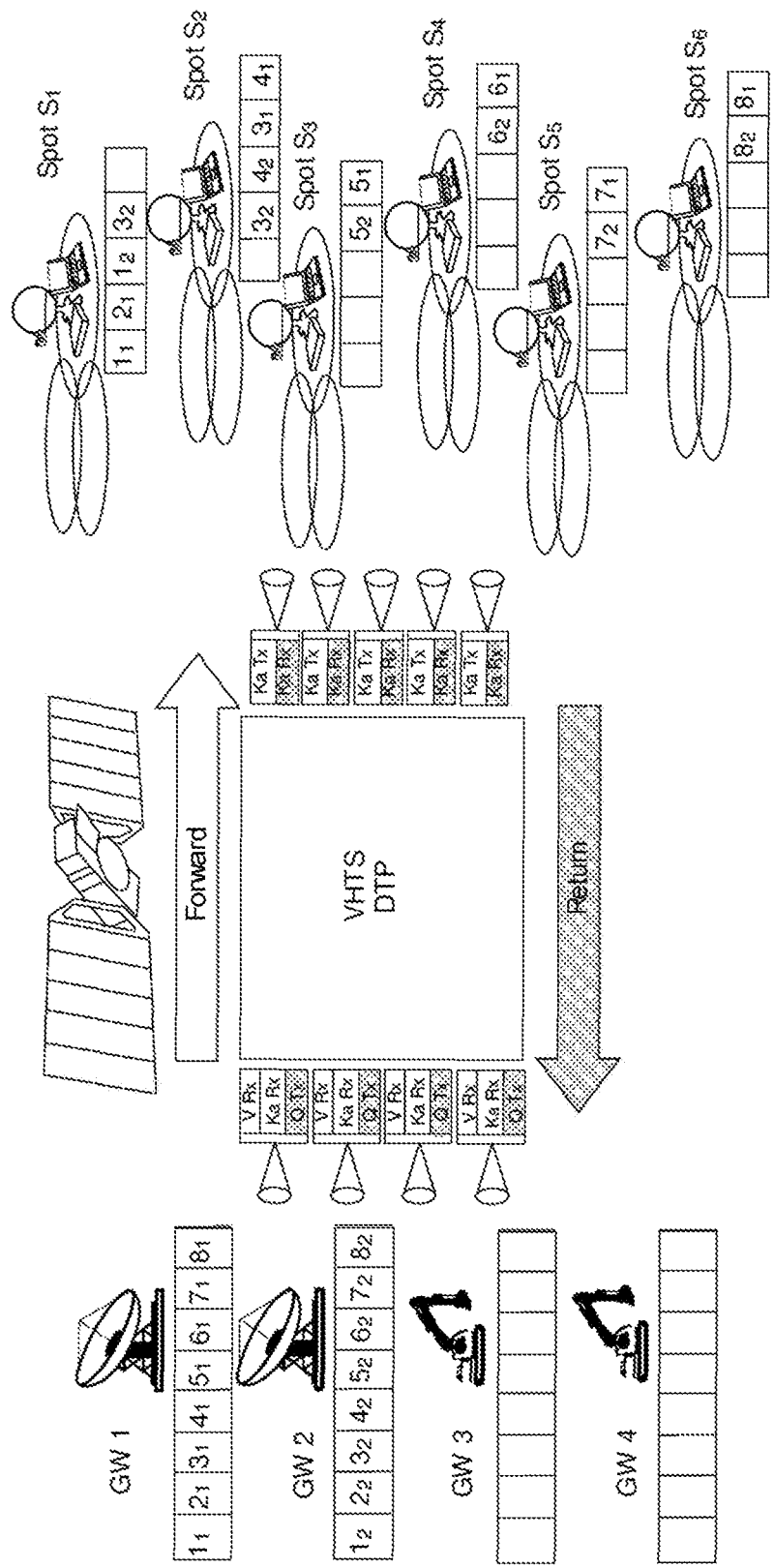
FIG. 9 is a view of a third particular exemplary configuration allowed by the multibeam payload according to the invention of FIGS. 4 and 5 which shows the flexibility afforded by the digital processor to progressively roll out the number of access stations as the traffic demand increases over the whole of the service coverage.

According to FIG. 9 and a third particular exemplary configuration allowed by the multibeam payload according to the invention of FIGS. 4 and 5, the flexibility afforded by the digital processor makes it possible to progressively roll out the number of access stations as the traffic demand increases over the whole of the service coverage.

The invention claimed is:

1. A multibeam telecommunications payload for applications of very-high-throughput space telecommunications or of high-throughput space telecommunications comprising:
   a first multibeam antenna system of passive antennas, which is configured to receive from satellite receive Rx access station GW spots and transmit to satellite transmit Tx access station GW spots, respectively in a first satellite receive Rx band and a first satellite transmit Tx band; and
   a second multibeam antenna system of passive antennas, which is configured to receive from and transmit to a user coverage zone respectively in a second satellite receive Rx band and a second satellite transmit Tx band, by generating multiple satellite receive user spots and multiple satellite transmit user spots;
   the payload being wherein it comprises:
   a digital core, based on a digital transparent processor DTP, dimensioned through a sufficient number of accesses at input and at output to be connected to all the spots of the access stations and all the user spots, and configured to offer total connectivity and total flexibility of allocation of frequency slots to the access station and user spots; and
   an RF switching set, made up of one or more matrices of RF switches on source accesses of user spots in satellite transmit Tx only or in satellite transmit Tx and in satellite receive Rx so as to implement operation by beam hopping on clusters Gj/G'j of Tx and/or Rx user spots for which the number of spots Rj/R'j is less than or equal to the total number P of access station spots.

2. The multibeam telecommunications payload according to claim 1, in which
   when the payload is of VHTS type,
   the first receive Rx band comprises a part of the V-band, lying between 47.7 GHz and 51.4 GHz, formed by a first sub-band and/or a second sub-band which are mutually separated or adjacent, and/or a part of the Ka-band, lying between 27.0 GHz and 29.5 GHz, forming a third sub-band,
   and the first transmit Tx band comprises a fourth sub-band, part of the Q-band, lying between 37.5 GHz and 42.5 GHz, and
   the second receive Rx band comprises a fifth sub-band, part of the Ka-band lying between 29.5 GHz and 30 GHz, and separated from or adjacent to the third sub-band, and
   the second transmit Tx band comprises a sixth sub-band, part of the Ka-band, lying between 17.3 GHz and 20.2 GHz; or
   when the payload is of HTS type,
   the first receive Rx band comprises a first sub-band, part of the Ka-band, lying between 27.0 GHz and 29.5 GHz, and the first transmit Tx band comprises a second sub-band, part of the Ka-band, lying between 17.3 GHz and 17.7 GHz; and
   the second receive Rx band comprises a third sub-band, part of the Ka-band, lying between 29.5 GHz and 30 GHz, and the second transmit Tx band comprises a fourth sub-band, part of the Ka-band, lying between 17.7 GHz and 20.2 GHz.

3. The multibeam telecommunications payload according to claim 1,
   in which the first multibeam antenna system comprises an integer number P, greater than or equal to 2, of accesses to the receive spots of the access stations GW, equal to the total number of access stations GW, and is configured so that each access station GW receive spot created services a single access station GW, and
   the multibeam telecommunications payload furthermore comprising P first low noise amplifiers LNA, each LNA being connected between the single access of a satellite Rx receive spot of a different access station and a different input of the digital transparent processor DTP.

4. The multibeam telecommunications payload according to claim 1,
   in which the first multibeam antenna system comprises a number P of accesses to the transmit spots of the access stations GW equal to the total number of access stations GW and is configured so that each access station transmit spot services a single access station GW, and
   comprising a number P of second power amplifiers HPA connected between the P transmit accesses of the access stations GWs and outputs of the digital transparent processor DTP.

5. The multibeam telecommunications payload according to claim 1,
   in which the second multibeam antenna system comprises an integer number N of source accesses to the satellite transmit user spots, and
   comprising:
   a number K1 of third RF power amplifiers HPA connected directly to K1 source accesses to the satellite transmit user spots taken from among the N transmit user spot accesses, K1 being an integer number less than or equal to N−1, and
   a number K2 of third RF power amplifiers HPA connected to the N−K1 remaining transmit user spot source accesses through K2 switching matrices Mj, each allowing the implementation of beam hopping on a different cluster Gj of Tx user spots for which the number of spots Rj is less than or equal to the total number P of spots of transmit Tx access stations GW,
   the integer numbers N, K1, K2 and Rj, j varying from 1 to K2 satisfying the relation:

$N = K1 + \sum_{j=1}^{K2} R_j$

6. The multibeam telecommunications payload according to claim 5,
   in which the second multibeam antenna system comprises an integer number of source accesses to the satellite receive transmit user spots which is equal to the number N, and
   comprising:
   a number K'1 of fourth low noise RF amplifiers LNA connected directly to K'1 source accesses to the satellite receive user spots taken from among the N receive user spot accesses, and a number K'2 of fourth low noise RF amplifiers LNA connected to the N−K'1 remaining receive user spot source accesses through K'2 switching matrices Nj, each allowing the implementation of beam hopping on a different cluster G'j of receive Rx user spots for which the number of spots R'j is less than or equal to the total number P of spots of receive Rx access stations GW, the integer numbers N, K'1, K'2 and R'j, j varying from 1 to K'2 satisfying the relation:

$$N=K'1+\Sigma_{j=1}^{R'2}R'_j$$

7. The multibeam telecommunications payload according to claim 1, furthermore comprising:
conversion chains, connected around the digital transparent processor DTP, and configured to interface the RF components of the payload operating in the first and second transmit Tx and receive Rx bands and inputs and outputs of the transparent digital processor operating at a useful intermediate frequency compatible with the useful-band widths managed by access in reception and in transmission of the processor.

8. The multibeam telecommunications payload according to claim 1, in which
the digital transparent processor DTP is configured to create frequency paths wherein
a connectivity between the access spots GW and the user spots for the forward pathway and between the user spots and the access spots in return pathway, and
a frequency plan taking into account a traffic need and frequency coordination constraints.

9. The multibeam telecommunications payload according to claim 1, in which
each matrix Mj, Nj, of RF switches on source accesses of user spots in satellite transmit Tx only or in satellite transmit Tx and in satellite receive Rx, part of the RF switching set, is configured to distribute temporally, in satellite transmit Tx the signal amplified by the power amplifier directly connected upstream of the matrix Mj on the user spots according to a predetermined transmit Tx temporal allocation plan for transmit time slots, and in satellite receive Rx the signals of the user spots connected to one and the same matrix Nj on the low noise amplifier directly connected downstream of the said matrix Nj according to a predetermined receive Rx temporal allocation plan for receive time slots.

10. The multibeam telecommunications payload according to claim 1, furthermore comprising a calculator or several calculators for configuring in a static or dynamic manner,
the digital processor DTP in terms of a matrix of connectivity from the access spots GW to the user spots for the forward pathway and from the user spots to the access spots for the return pathway and in terms of a frequency plan, and
the matrix or matrices of switches for the implementation of beam hops in terms of a transmit Tx temporal allocation plan, or in terms of a transmit Tx temporal allocation plan and of a receive Rx temporal allocation plan,
the connectivity matrix, the frequency plan and the temporal allocation plan(s) depending on the spatial and temporal distribution of the traffic demand as a whole of the user spots and frequency coordination constraints.

11. The multibeam telecommunications payload according to claim 10, furthermore comprising a memory of configurations of the digital processor DTP and of the matrix or matrices of RF switches, in which different configurations in terms of triplets each made up of a connectivity matrix, a frequency plan, a transmit Tx temporal allocation plan or of quadruplets each made up of a connectivity matrix, a frequency plan, a transmit Tx temporal allocation plan and a receive Tx temporal allocation plan,
the configurations being activatable at different instants forming a configurations activation sequence.

12. The multibeam telecommunications payload according to claim 1, in which
the digital transparent processor DTP is configured to provide total flexibility in terms of passband allocation to the user spots as a function of the traffic needs without overdimensioning the number of access stations GW.

13. The multibeam telecommunications payload according to claim 1, in which
each matrix Mj of transmit RF switches, connected to a single power amplifier HPA and associated with a group Gj of transmit user spots, is configured to connect in turn a transmit user spot of the group Gj to the power amplifier HPA and allow it to receive the entire band amplified by the said HPA, and
the digital transparent processor DTP is configured to load each amplifier HPA, connected to a matrix Mj of transmit RF switches, with the frequency bands actually available on account of possible coordination constraints for the set Gj of transmit user spots connected to the same HPA.

14. The multibeam telecommunications payload according to claim 1, in which
the digital transparent processor DTP is configured to load each amplifier HPA, connected to a matrix Mj of transmit RF switches, with the quantity of frequency band required to meet the temporal traffic variations demanded of the transmit user spots of the group Gj that are connected to the corresponding power amplifier HPA,
the matrices Mj of transmit RF switches are configured for beam hopping with possible modulation of the temporal sharing of the time between the spots of one and the same group Gj that are connected to one and the same HPA so as to supplement the capability of the DTP to allocate more or less band and to meet the faster traffic variations which the DTP cannot meet.

15. The multibeam telecommunications payload according to claim 1, in which
the digital transparent processor DTP and the beam hopping switch matrices are configured to connect several Rx access station access spots to one and the same Tx user spot while ensuring independent management of the gains of channels arising from each access station GW connected to the said same transmit user spot.

* * * * *

UNITED STATES PATENT AND TRADEMARK OFFICE
CERTIFICATE OF CORRECTION

PATENT NO. : 10,461,845 B2
APPLICATION NO. : 16/052053
DATED : October 29, 2019
INVENTOR(S) : Philippe Voisin Page 1 of 1

It is certified that error appears in the above-identified patent and that said Letters Patent is hereby corrected as shown below:

In the Claims

In Claim 6, Column 21, Line 10, the formula should be corrected as:
$$N = K'1 + \sum_{j=1}^{K'2} R'_j$$

Signed and Sealed this
Fourth Day of February, 2020

Andrei Iancu
*Director of the United States Patent and Trademark Office*